(12) United States Patent
Stone et al.

(10) Patent No.: US 6,847,650 B1
(45) Date of Patent: Jan. 25, 2005

(54) SYSTEM AND METHOD FOR UTILIZING A MEMORY DEVICE TO SUPPORT ISOCHRONOUS PROCESSES

(75) Inventors: Glen D. Stone, Los Gatos, CA (US); David V. James, Palo Alto, CA (US); Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 764 days.

(21) Appl. No.: 09/607,066

(22) Filed: Jun. 29, 2000

(51) Int. Cl.[7] .......................... H04L 12/28; G06F 12/00
(52) U.S. Cl. ...................... 370/431; 370/412; 711/117
(58) Field of Search ................................ 370/431, 437, 370/438, 439, 447, 462, 412, 419, 420, 395.1, 463, 360; 710/52, 22, 309, 310; 711/147, 148, 150, 153, 158, 170

(56) References Cited

U.S. PATENT DOCUMENTS

| | | | | |
|---|---|---|---|---|
| 6,072,796 A | * | 6/2000 | Christensen et al. | 370/379 |
| 6,101,613 A | * | 8/2000 | Garney et al. | 713/600 |
| 6,151,651 A | * | 11/2000 | Hewitt et al. | 710/315 |
| 6,192,428 B1 | * | 2/2001 | Abramson et al. | 710/52 |
| 6,260,119 B1 | * | 7/2001 | Garney et al. | 710/52 |
| 6,333,938 B1 | * | 12/2001 | Baker | 370/503 |
| 6,378,056 B2 | * | 4/2002 | Nizar et al. | 711/170 |
| 6,438,604 B1 | * | 8/2002 | Kuver et al. | 709/234 |
| 6,453,376 B1 | * | 9/2002 | Fairman et al. | 710/240 |
| 6,578,109 B1 | * | 6/2003 | Stone et al. | 711/118 |
| 6,594,711 B1 | * | 7/2003 | Anderson et al. | 710/22 |
| 6,667,987 B1 | * | 12/2003 | Kwon et al. | 370/437 |
| 2003/0115430 A1 | * | 6/2003 | Stone et al. | 711/158 |

* cited by examiner

*Primary Examiner*—Brian Nguyen
(74) *Attorney, Agent, or Firm*—Gregory J. Koerner; Redwood Patent Law

(57) ABSTRACT

A system and method for utilizing a memory device to support isochronous processes comprises a memory device that may be partitioned to provide an isochronous memory for storing high-priority isochronous information, and a processor device for accessing and utilizing the isochronous information that is stored in the isochronous memory. The isochronous memory is reserved for storing the isochronous information, and may be reconfigured into a selectable number of memory channels of varying size that each corresponds to an associated isochronous process.

49 Claims, 13 Drawing Sheets

SYSTEM AND METHOD FOR UTILIZING A MEMORY DEVICE TO SUPPORT ISOCHRONOUS PROCESSES

BACKGROUND SECTION

1. Field of the Invention

This invention relates generally to techniques for transferring and storing data, and relates more particularly to a system and method for utilizing a memory device to support isochronous processes.

2. Description of the Background Art

Implementing effective methods for transferring data is a significant consideration for designers and manufacturers of contemporary electronic devices. An electronic device in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Effectively managing data transfer operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Furthermore, enhanced device capability to perform various advanced data transfer operations may provide additional benefits to a system user, but may also place increased demands on the control and management of the various devices in the electronic network. For example, an enhanced electronic network that effectively accesses, processes, and displays digital television programming may benefit from efficient processing techniques because of the large amount and complexity of the digital data involved.

One type of data transfer that may occur in an electronic network is a data transfer for an isochronous process. Isochronous processes include the guaranteed handling of data that arrives in a time-based stream at regular intervals called cycles. Isochronous processes are typically used for time-sensitive applications. For example, video or audio data being transmitted across a network typically needs to arrive at a display device in an uninterrupted flow with appropriate timing.

Due to growing demands on system resources and substantially increasing data magnitudes, it is apparent that developing new and effective methods for performing data transfer operations is a matter of significant concern for the related electronic technologies. Therefore, for all the foregoing reasons, implementing effective methods for efficiently performing data transfer operations remains a significant consideration for designers, manufacturers, and users of contemporary electronic devices.

SUMMARY

In accordance with the present invention, a system and method are disclosed for utilizing a memory device to support isochronous processes. In one embodiment, a computer device includes a central processing unit (CPU), a memory device, and a system bus that is isolated from an I/O bus by an I/O bus bridge. In practice, various types of information and data (including isochronous data) are preferably transferred bidirectionally between the memory device and the I/O bus via the system bus and the I/O bus bridge. In addition, the memory device preferably communicates bidirectionally with the CPU via the system bus. In other embodiments, the computer device may alternately be implemented using various other appropriate configurations and architectures.

In certain embodiments, the memory device may include an asynchronous memory for temporarily storing asynchronous data from various sources. In accordance with the present invention, the memory device also preferably includes an isochronous memory that may advantageously be locked to prevent access by other types of data transfers. The isochronous memory may also be flexibly reconfigured with regards to various selectable attributes such as data size and the number of different isochronous processes that are supported. The isochronous memory may advantageously include a plurality of variably-sized isochronous channels that may be accessed using unique channel numbers and separate read and write busses to thereby support concurrent isochronous write operations and isochronous read operations, in accordance with the present invention.

Isochronous data typically is time-sensitive data that is assigned a high transfer and processing priority to guarantee that the isochronous data deterministically arrives at predetermined timing intervals and is processed accordingly. Ensuring the timely and guaranteed arrival of isochronous data at the CPU becomes a matter of some significance when implementing the computer device. The computer device may therefore flexibly reserve a re-configurable portion of the memory device as the isochronous memory to ensure deterministic performance of isochronous processes, in accordance with the present invention. The present invention thus provides an improved system and method for utilizing a memory device to support isochronous processes.

DETAILED DESCRIPTION

The present invention relates to an improvement in electronic devices. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for utilizing a memory device to support isochronous processes, and includes a memory device that is partitionable to provide an isochronous memory for storing high-priority isochronous information, and a processor device for accessing and utilizing the isochronous information that is stored in the isochronous memory. The isochronous memory is reserved for storing the isochronous information, and may be reconfigured into a selectable number of memory channels of varying size that each corresponds to an associated isochronous process.

Figure 1:
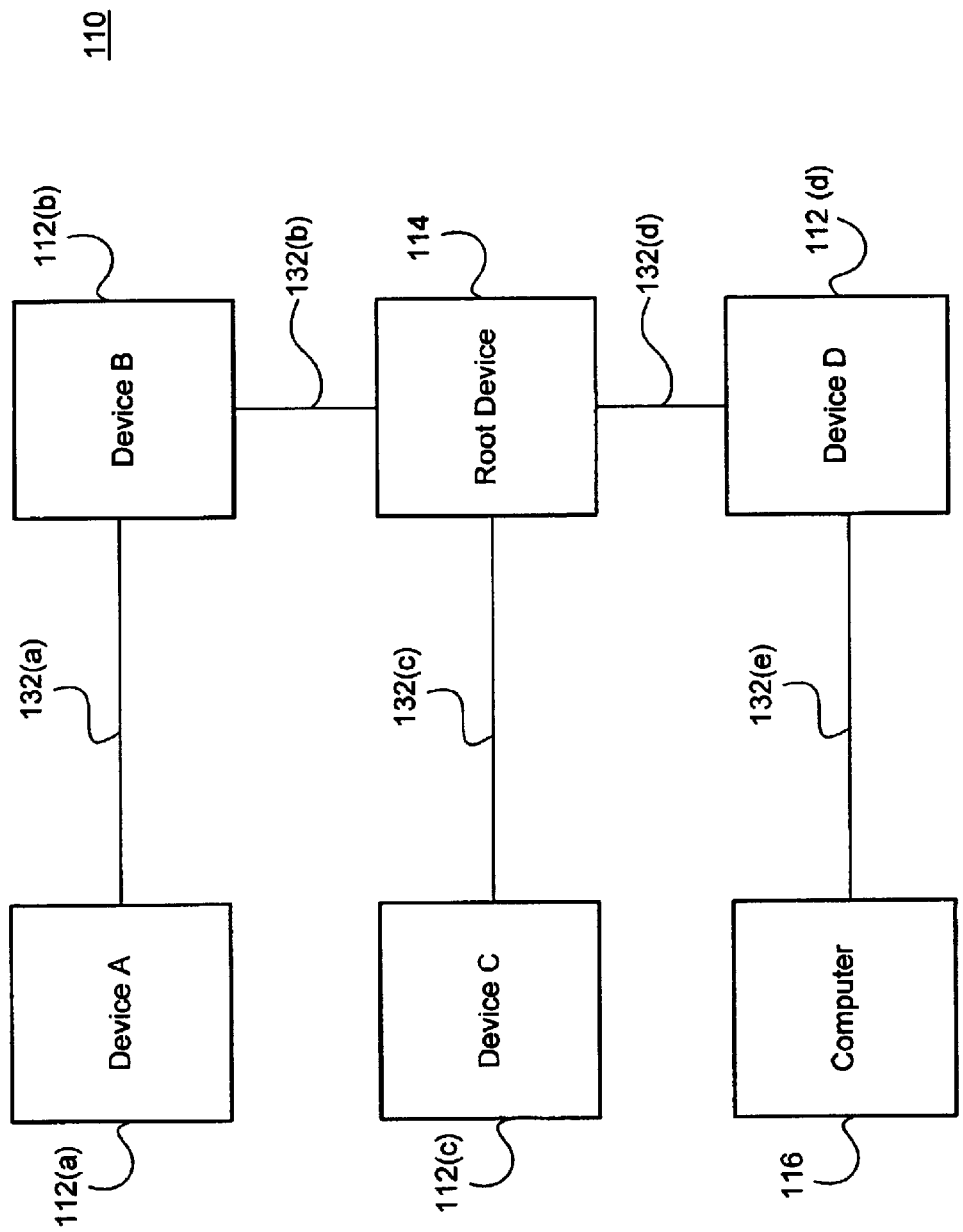
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices (device A 112(a), device B 112(b), device C 112(c), device D 112(d), and device E 112(e)), and computer 116. In alternate embodiments, electronic network 110 may readily be configured to include various other devices or components in addition to, or instead of, those discussed in conjunction with the FIG. 1 embodiment. In alternate embodiments, network 110 may readily be connected and configured in any other appropriate and suitable manner.

In the FIG. 1 embodiment, devices 112 and computer 116 of network 110 may alternately be implemented as any type of electronic device, including, but not limited to, personal computers, printers, digital video disc devices, television sets, audio systems, video cassette recorders, and set-top boxes for digital broadcasting. In the FIG. 1 embodiment, devices 112 and computer 116 preferably communicate with one another using a network bus 132. Network bus 132 preferably includes path 132(a), path 132(b), path 132(c), path 132(d), and path 132(e). For example, device B 112(b) is coupled to device A 112(a) via path 132(a), and to device E (112e) via path 132(b). Similarly, device E (112(e)) is coupled to device C 112(c) via path 132(c), and to device D 112(d) via path 132(d). In addition, device D 112(d) is coupled to computer 116 via path 132(e). In the FIG. 1 embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies, which are equally within the scope of the present invention.

In the FIG. 1 embodiment, certain devices 112 and/or computer 116 in electronic network 110 may communicate with other devices 112 and/or computer 116 within network 110. For example, computer 116 may communicate with device B 112(b) by transmitting transfer data via cable 132(e) to device D 112(d), which may then transmit the transfer data via cable 132(d) to device E (112(e)). In response, device E 112(e) then may transmit the transfer data to device B 112(b) via cable 132(b).

Figure 2:
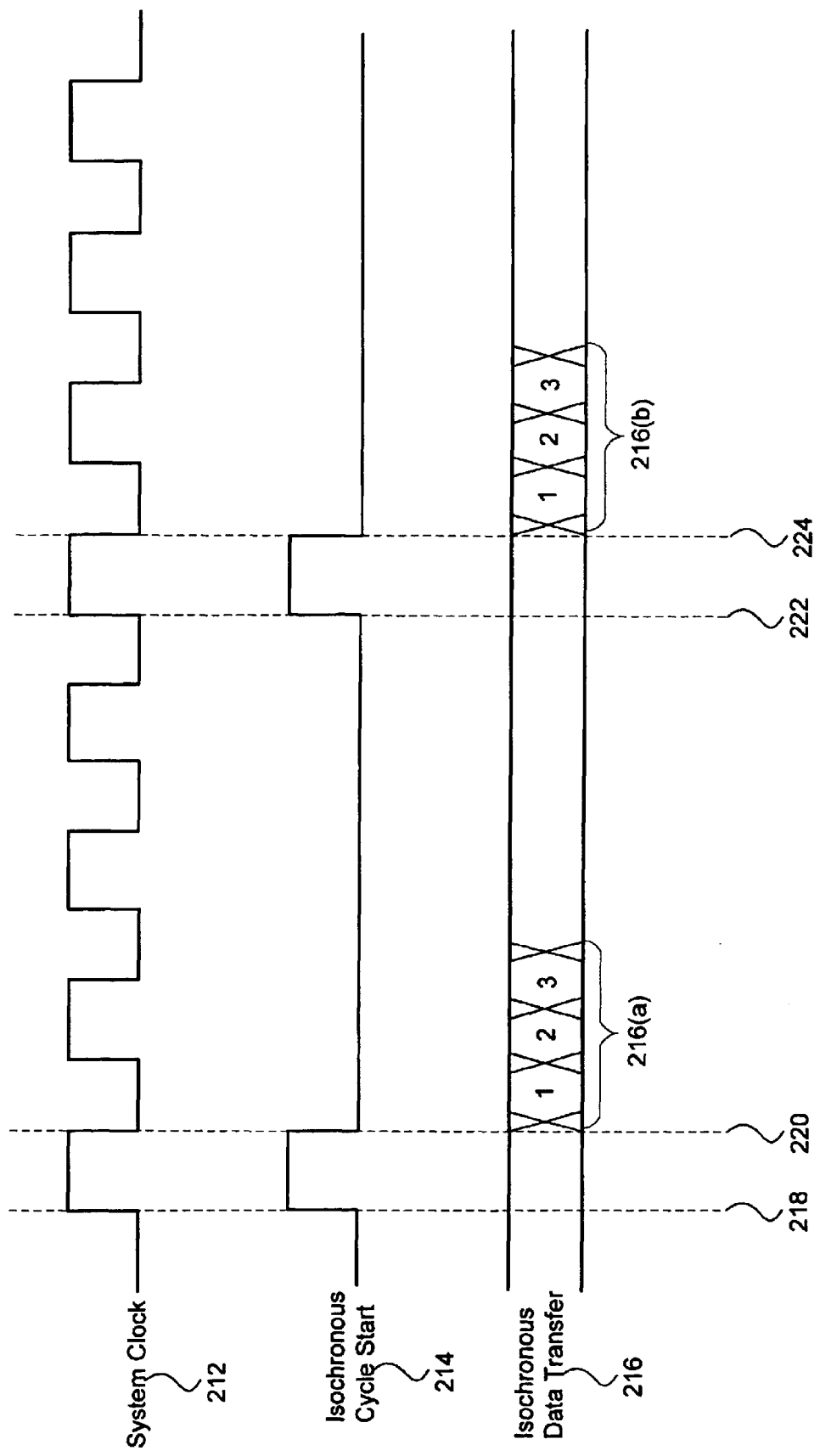
FIG. 2 is a timing diagram for one embodiment of exemplary isochronous data transfers, in accordance with the present invention.

Referring now to FIG. 2, a timing diagram for one embodiment of exemplary isochronous data transfers is shown, in accordance with one embodiment of the present invention. The FIG. 2 timing diagram includes a system clock 212, an isochronous cycle start signal 214, and an isochronous data transfer signal 216. In FIG. 2, at time 218, a first isochronous cycle start pulse changes state in synchronization with system clock 212. At time 220, the isochronous cycle start pulse changes state again, and isochronous data transfer 216(a) responsively occurs in a deterministic manner.

Similarly, at time 222, a second isochronous cycle start pulse changes state in synchronization with system clock 212. At time 224, the second isochronous cycle start pulse once more changes state, and isochronous data transfer 216(b) again occurs in a deterministic manner. Therefore, as illustrated in FIG. 2, isochronous data transfers 216(a) and 216(b) typically occur at a pre-determined time and frequency in network 110. Furthermore, network 110 may cause isochronous data transfers 216(a) and 216(b) to occur before any asynchronous data transfers because of the time-sensitive nature of isochronous data.

Figure 3:
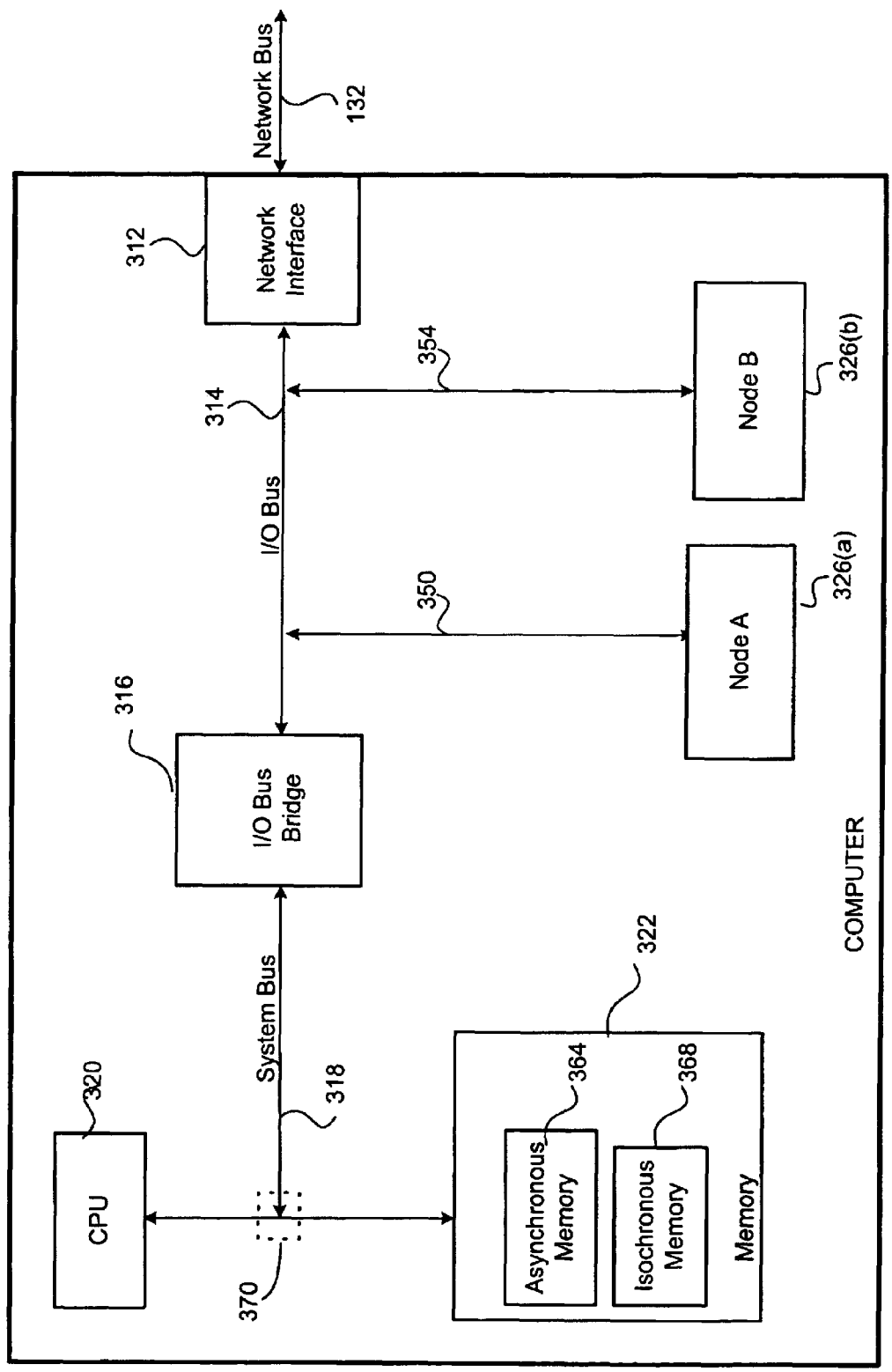
FIG. 3 is a block diagram for one embodiment of the computer of FIG. 1, in accordance with the present invention.

Referring now to FIG. 3, a block diagram for one embodiment of the FIG. 1 computer 116 is shown, in accordance with the present invention. In the FIG. 3 embodiment, computer 116 preferably includes an input/output (I/O) bus 314 for transferring various types of information and data to or from computer 116. In the FIG. 3 embodiment, I/O bus 314 is preferably implemented according to a Peripheral Component Interconnect (PCI) bus specification that is further described in "PCI Local Bus Specification," Revision 2.1s, 1995, PCI Special Interest Group, which is hereby incorporated by reference. However, in alternate embodiments, I/O bus 314 may be implemented according to any appropriate and compatible specification or standard.

In the FIG. 3 embodiment, a network interface 312 is preferably coupled to both I/O bus 314 and network bus 132 (FIG. 1) to serve as an interface for transferring isochronous data and asynchronous data between computer 116 and network 110. In addition, a node A 326(a) and a node B 326(b) are also coupled to I/O bus 314 via respective paths 350 and 354. In the FIG. 3 embodiment, node A 326(a) and/or node B 326(b) may be integral with computer 116, or, alternately, node A 326(a) and/or node B 326(b) may be external to computer 116. For purposes of illustration and clarity, the FIG. 3 computer 116 shows only two nodes 326, however, in alternate embodiments, computer 116 may include any number of input/output nodes 326.

Node A 326(a) and node B 326(b) preferably may include any desired type of interface, device, circuit, process, or node, including, for example, an ethernet interface, a printer device, a modem, or a graphics device. Furthermore, computer 116 may alternately be implemented as various other types of electronic devices including, for example, a set-top box or a digital television interface. Computer 116 also includes a central processing unit (CPU) 320, a memory 322, and a system bus 318 that is isolated from I/O bus 314 by an I/O bus bridge 316. In practice, various types of information and data are preferably transferred by computer 116 between memory 322 and I/O bus 314 via system bus 318 and I/O bus bridge 316. In addition, memory 322 preferably communicates bidirectionally with CPU 320 via system bus 318. In other embodiments, computer 116 may be implemented in various other configurations and architectures.

In the FIG. 3 embodiment, memory 322 preferably includes an asynchronous memory 364 for temporarily storing asynchronous data from various sources. In accordance with the present invention, memory 322 also preferably includes an isochronous memory 368 that may advantageously be locked to prevent access by other types of data transfers, and that may also be flexibly reconfigured with regards to selectable attributes such as data size and the number of different isochronous processes that are supported.

As discussed above, isochronous data typically is time-sensitive data that is assigned a high transfer and processing priority to guarantee that the isochronous data deterministically arrives at pre-determined timing intervals and is processed accordingly. Because of the time-sensitive nature of isochronous data, re-transmission of an isochronous data transfer may not be appropriate or possible. For example, if a frame of video data does not reach a display device on network 110 until after the appropriate moment for display of that frame, then re-transmitting the delayed frame is not productive. Sources of isochronous data therefore typically do not repeat unsuccessful isochronous data transmissions. Loss of the foregoing frame of video data may likely cause unwanted jitter or breakup of the corresponding video programming.

Therefore, ensuring the timely and guaranteed arrival of isochronous data at CPU 320 becomes a matter of some importance when implementing network 110. Computer 116 may therefore flexibly reserve a re-configurable portion of memory 322 as isochronous memory 368 to ensure deterministic performance of isochronous processes, in accordance with the present invention. This method for ensuring timely completion of isochronous data transfers to support isochronous processes is further discussed below in conjunction with FIGS. 4 through 13.

Figure 4:
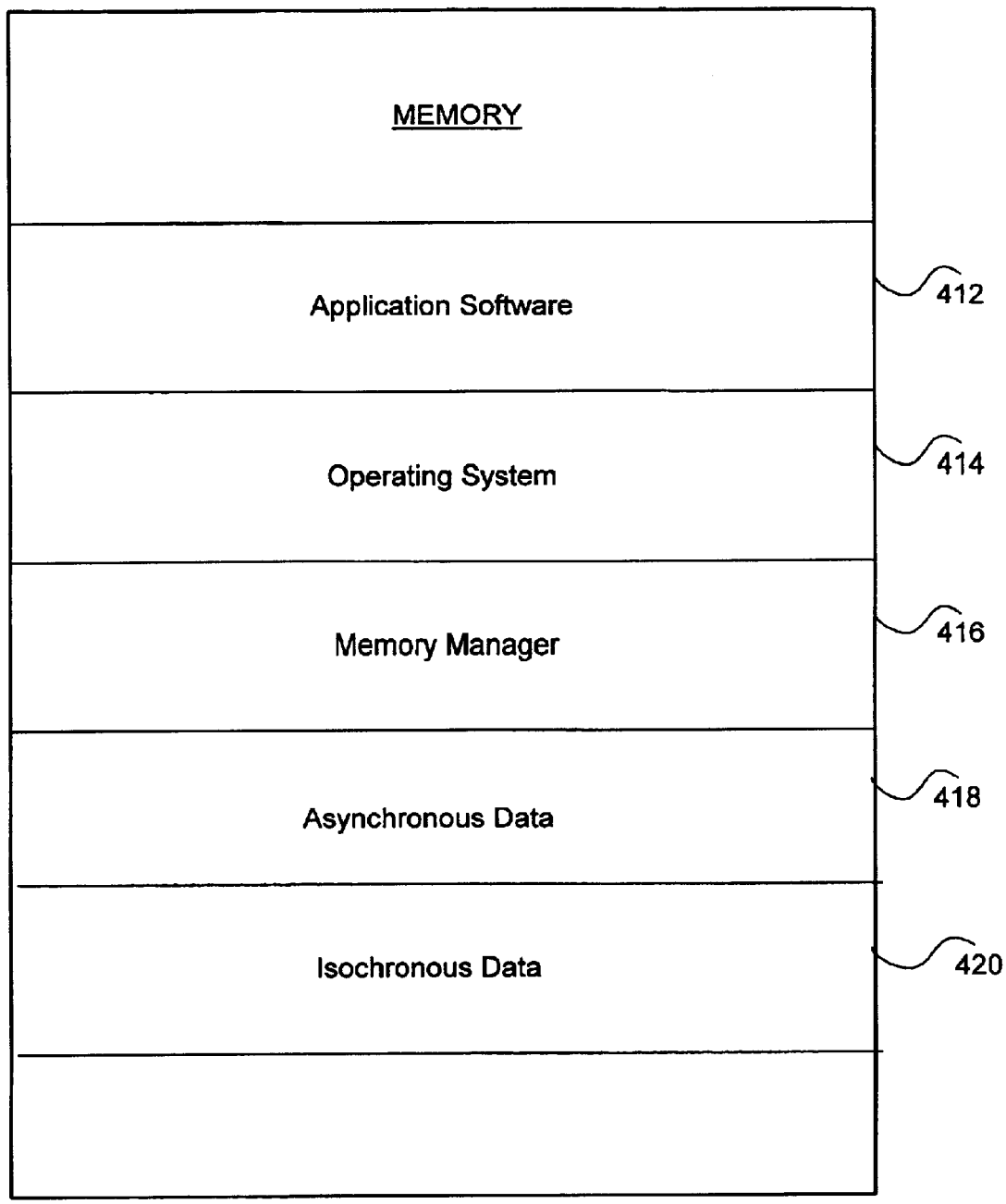
FIG. 4 is a block diagram for one embodiment of the memory of FIG. 3, in accordance with the present invention.

Referring now to FIG. 4, a block diagram for one embodiment of the FIG. 3 memory 322 is shown, in accordance with the present invention. In the FIG. 4 embodiment, memory 322 preferably includes, but is not limited to, application software 412, an operating system 414, a memory manager 416, asynchronous data 418, and isochronous data 420. In alternate embodiments, memory 322 may readily include various other components in addition to, or instead of, the components that are discussed in conjunction with the FIG. 4 embodiment.

In the FIG. 4 embodiment, application software 412 includes software instructions that are preferably executed by CPU 320 (FIG. 3) for performing various functions and operations by computer 116. The particular nature and functionality of application software 412 preferably varies depending upon factors such as the type and purpose of the corresponding host device 116. Application software 412 may include various instructions that cause CPU 320 to transfer portions of asynchronous data 418 or isochronous data 420 bi-directionally between memory 322 and CPU 320 via system bus 318, in accordance with the present invention.

In the FIG. 4 embodiment, operating system 414 preferably controls and coordinates low-level functionality of device 116. Memory manager 416 preferably manages the scheduling and execution of various processes and functions for memory 322, and may be integral with, or separate from, operating system 414. The functionality and operation of memory manager 416 is further discussed below in conjunction with FIGS. 5 through 13.

Figure 5:
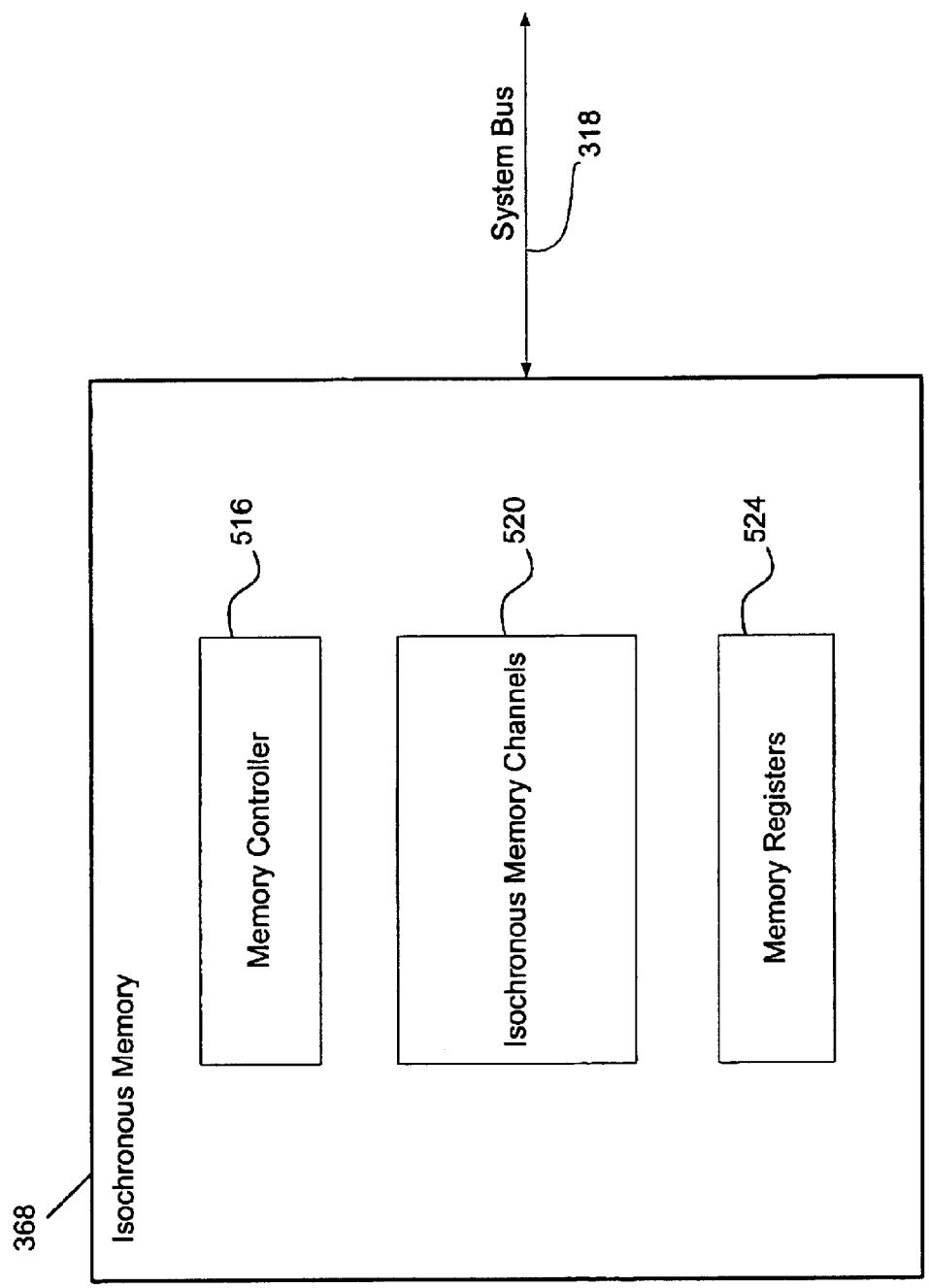
FIG. 5 is a block diagram for one embodiment of the isochronous memory of FIG. 3, in accordance with the present invention.

Referring now to FIG. 5, a block diagram for one embodiment of the FIG. 3 isochronous memory 368 is shown, in accordance with the present invention. In the FIG. 5 embodiment, isochronous memory 368 preferably includes, but is not limited to, a memory controller 516, isochronous memory channels 520, and memory registers 524. In alternate embodiments, isochronous memory 368 may readily include various other components in addition to, or instead of, the components that are discussed in conjunction with the FIG. 5 embodiment.

In the FIG. 5 embodiment, memory controller 516 preferably performs many of the control functions for isochronous memory 368. For example, memory controller 516 may flexibly reconfigure isochronous memory channels 520 in isochronous memory 368 in response to the requirements of various isochronous process requests. Isochronous memory channels 520 may include any appropriate configuration of memory that is coupled to computer 116. The authorization, setup, and configuration of isochronous memory channels 520 is further discussed below in conjunction with FIGS. 6, 7, and 11.

In addition, memory controller 516 may also effectively coordinate and control the movement of information both in and out of memory channels 520. In the FIG. 5 embodiment, memory controller 516 may send or receive information via system bus 318, as discussed below in conjunction with FIGS. 12 and 13. In the FIG. 5 embodiment, memory registers 524 preferably include various information for managing and controlling isochronous memory 368. The configuration and utilization of memory registers 524 is further discussed below in conjunction with FIGS. 6, 7, and 11.

Figure 6:
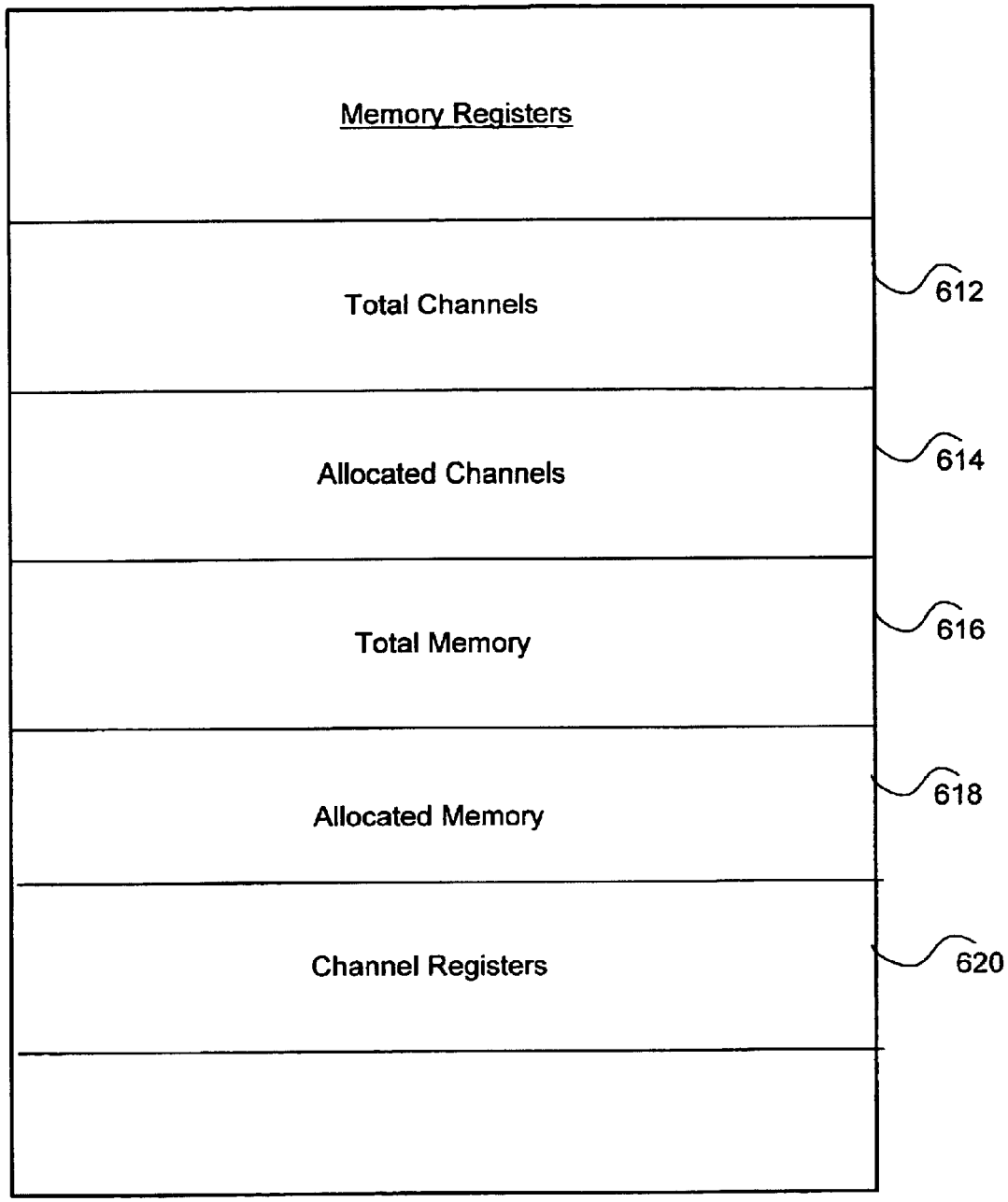
FIG. 6 is a block diagram for one embodiment of the memory registers of FIG. 5, in accordance with the present invention.

Referring now to FIG. 6, a block diagram for one embodiment of the FIG. 5 memory registers 524 is shown, in accordance with the present invention. In alternate embodiments, memory registers 524 may readily include various other components in addition to, or instead of, the components that are discussed in conjunction with the FIG. 6 embodiment.

In the FIG. 6 embodiment, memory registers 524 are preferably maintained, updated, and controlled by memory manager 416 (FIG. 4) to indicate the current status of isochronous memory 368. For example, memory registers 524 may be utilized to determine the current number of memory channels 520 in isochronous memory 368, or to determine the amount of memory available in isochronous memory 368. Therefore, memory manager 416 preferably updates memory registers 524 whenever isochronous memory is reconfigured to accommodate a new or different isochronous process.

In the FIG. 6 embodiment, a total channels field 612 preferably indicates the total number of isochronous memory channels that isochronous memory 368 is designed to support. An allocated channels field 614 preferably indicates the number of isochronous isochronous memory channels 520 that are currently allocated for use by active isochronous processes. Any interested entity may thus determine whether any available isochronous memory channels 520 exist by subtracting the allocated channels field 614 from the total channels field 612.

In the FIG. 6 embodiment, a total memory field 616 preferably indicates the total amount of memory 322 that isochronous memory 368 may utilize. An allocated memory field 618 preferably indicates the amount of isochronous memory (in memory channels 520) that is currently allocated for use by active isochronous processes. Any interested entity may thus determine whether any available isochronous memory space exists by subtracting the allocated memory field 618 from the total memory field 616.

In the FIG. 6 embodiment, channel registers 620 preferably include a series of individual registers that each correspond to a particular memory channel 520, as well as to a particular isochronous process. The configuration and functionality of channel registers 620 is further discussed below in conjunction with FIG. 7.

Figure 7:
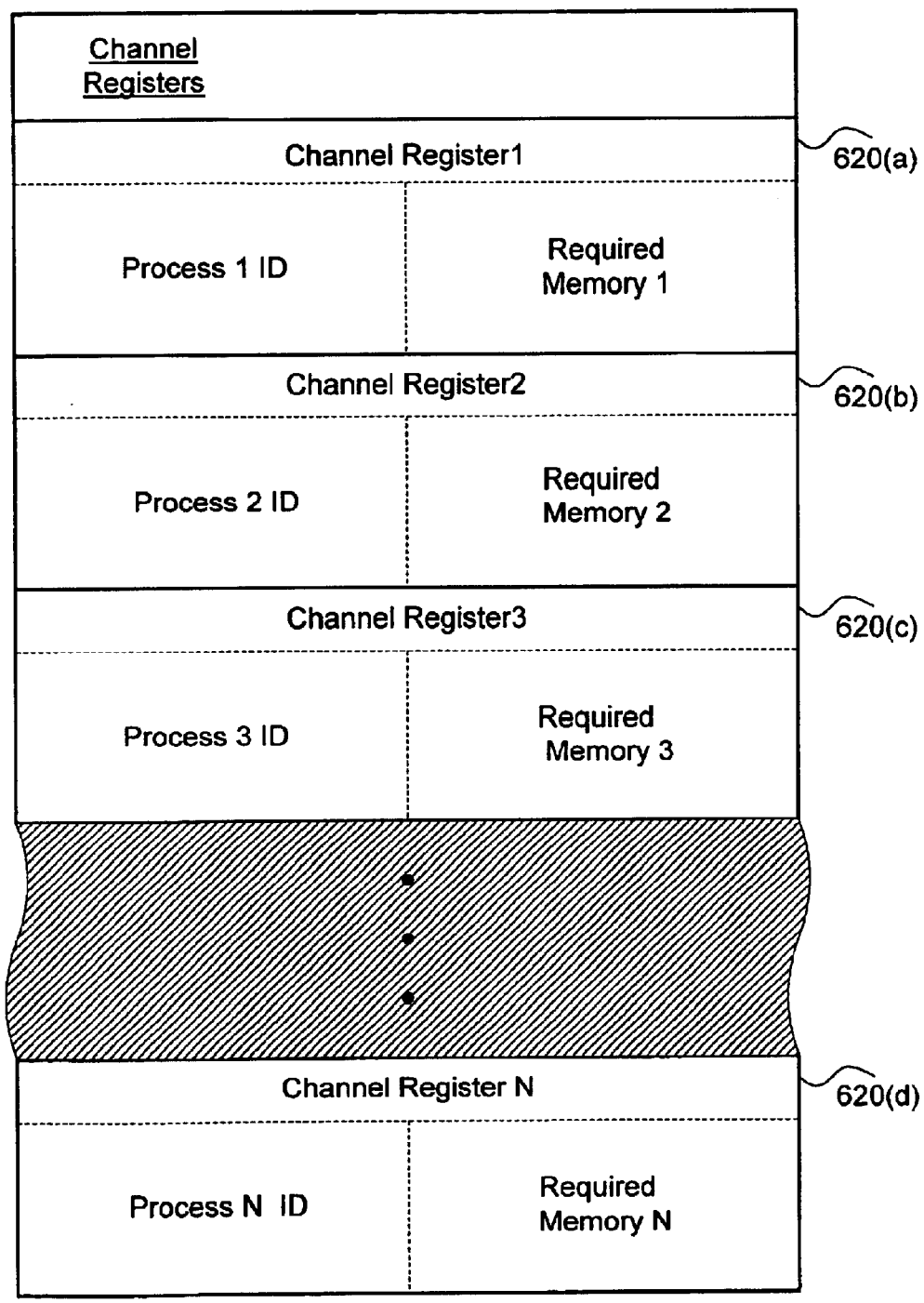
FIG. 7 is a block diagram for one embodiment of the channel registers of FIG. 6, in accordance with the present invention.

Referring now to FIG. 7, a block diagram for one embodiment of the FIG. 6 channel registers 620 is shown, in accordance with the present invention. In the FIG. 7 embodiment, channel registers 620 preferably include a channel register 1 (620(*a*)) through a channel register N (620(*d*)). In alternate embodiments, channel registers 620 may readily include various other components in addition to, or instead of the components that are discussed in conjunction with the FIG. 7 embodiment. For example, channel registers 620 may include such fields as an active channel field that indicates whether a memory channel 520 is currently allocated for active use, a packet number field that indicates the number of packets in a given memory channel 520, an error control field that includes relevant error information, and a security field that includes information for use in supporting device security functions for computer 116.

In the FIG. 7 embodiment, each channel register 620 preferably also includes a separate process identifier (process ID) field and a required memory field. The process ID field preferably includes a unique identifier that corresponds to the associated isochronous process for which a particular memory channel 520 is allocated to store information. The required memory field preferably includes information to designate the amount of memory space (in isochronous memory 368) that is required to perform the associated isochronous process. Any interested entity may thus reference channel registers 620 to identify a particular isochronous process or determine the amount of isochronous memory required for that isochronous process.

Figure 8:
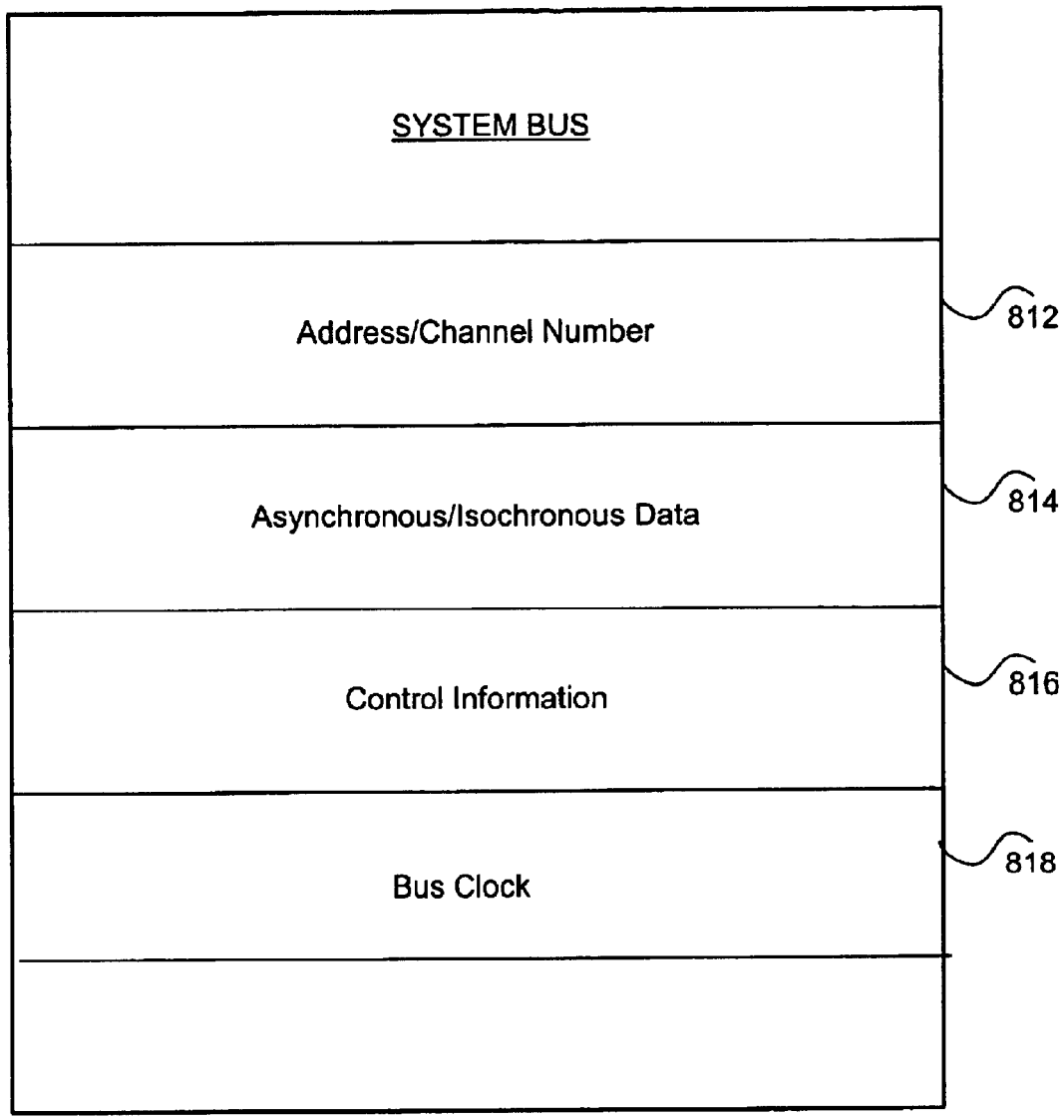
FIG. 8 is a block diagram for one embodiment of the system bus of FIG. 3, in accordance with the present invention.

Referring now to FIG. 8, a block diagram for one embodiment of the FIG. 3 system bus 318 is shown, in accordance with the present invention. In the FIG. 8 embodiment, system bus 318 includes, but is not limited to, either an address or a channel number 812, either asynchronous or isochronous data 814, control information 816, and a bus clock 818. In alternate embodiments, system bus 318 may readily include various other components in addition to, or instead of, the components that are discussed in conjunction with the FIG. 8 embodiment.

For example, in certain embodiments, system bus 318 may include a separate bi-directional asynchronous bus for asynchronous data 814 and a separate bi-directional isochronous bus for isochronous data 814. Alternately, system bus 318 may multiplex asynchronous data 814 and isochronous data 814 in a serial and non-concurrent manner. Bus clock 818 preferably includes appropriate timing information for operating and synchronizing system bus 318.

In the FIG. 8 embodiment, control information 816 may be implemented in a control bus that includes any information that is relevant to the control and management of system bus 318. For example, control information 816 may comprise a transfer mode indicator that includes either an asynchronous mode indicator or an isochronous mode indicator, in accordance with the present invention. In the FIG. 8 embodiment, if computer 116 detects an isochronous mode indicator in control information 816, then channel number 812 may be analyzed to determine the appropriate memory channel 520 for storing corresponding isochronous data 420. Conversely, if computer 116 detects an asynchronous mode indicator in control information 816, then address 812 may be analyzed to determine an appropriate location in asynchronous memory 364 for storing associated asynchronous data 418.

Figure 9:
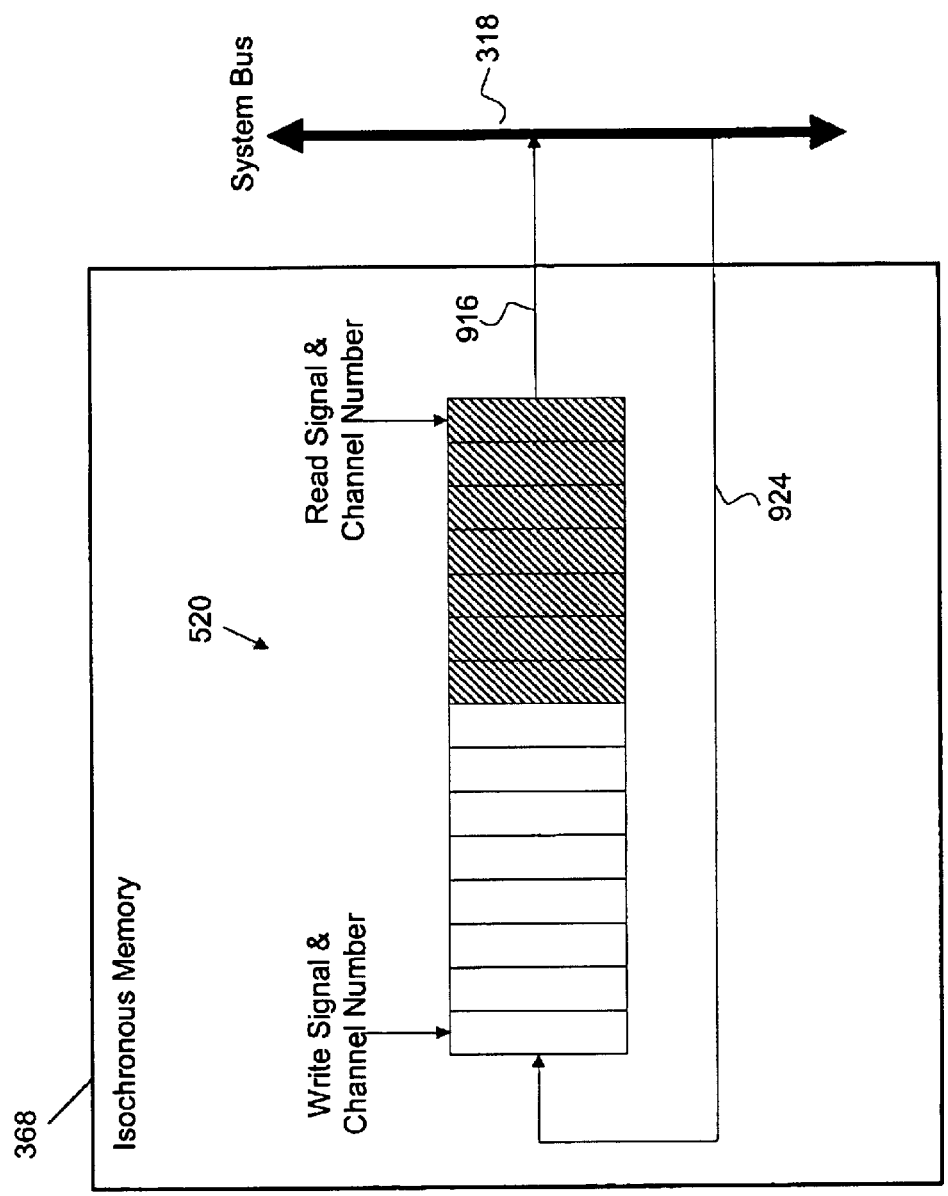
FIG. 9 is a block diagram for one embodiment of the memory of FIG. 3, in accordance with the present invention.

Referring now to FIG. 9, a block diagram for one embodiment of the FIG. 3 memory 322 is shown, in accordance with the present invention. In alternate embodiments, memory 322 may readily include various other components in addition to, or instead of, the components that are discussed in conjunction with the FIG. 9 embodiment. For example, the FIG. 9 embodiment shows a single isochronous memory channel 520. However, in various other embodiments, isochronous memory 368 may include any required number of isochronous memory channels 520.

In the FIG. 9 embodiment, isochronous data may be written into an input location of memory channel 520 from system bus 318 via write path 924 in response to a write signal and a channel number. Similarly, isochronous data may be read from an output location of memory channel 520 to system bus 318 via read path 916 in response to a read signal and a channel number.

In time-based isochronous data transfers, isochronous data is typically transported in a predictable sequence with deterministic timing. The isochronous data is frequently placed into memory 322 in the same order in which the isochronous data is received. The isochronous data is typically also accessed from memory 322 in a sequential manner. Therefore, the capability to randomly access isochronous memory 368 is of reduced importance. However, memory 322 is conventionally implemented in computer 116 as a random-access memory device.

The ability to flexibly configure memory 322 to support isochronous data transfers in a first-in-first-out manner may thus provide significant advantages in performing various isochronous processes. In addition, utilizing a single channel number to sequentially access a corresponding isochronous memory channel 520 provides a greatly simplified data-access methodology when compared to coordinating multiple addresses for data sources and data destinations to sequentially perform random access to memory 322.

Figure 10:
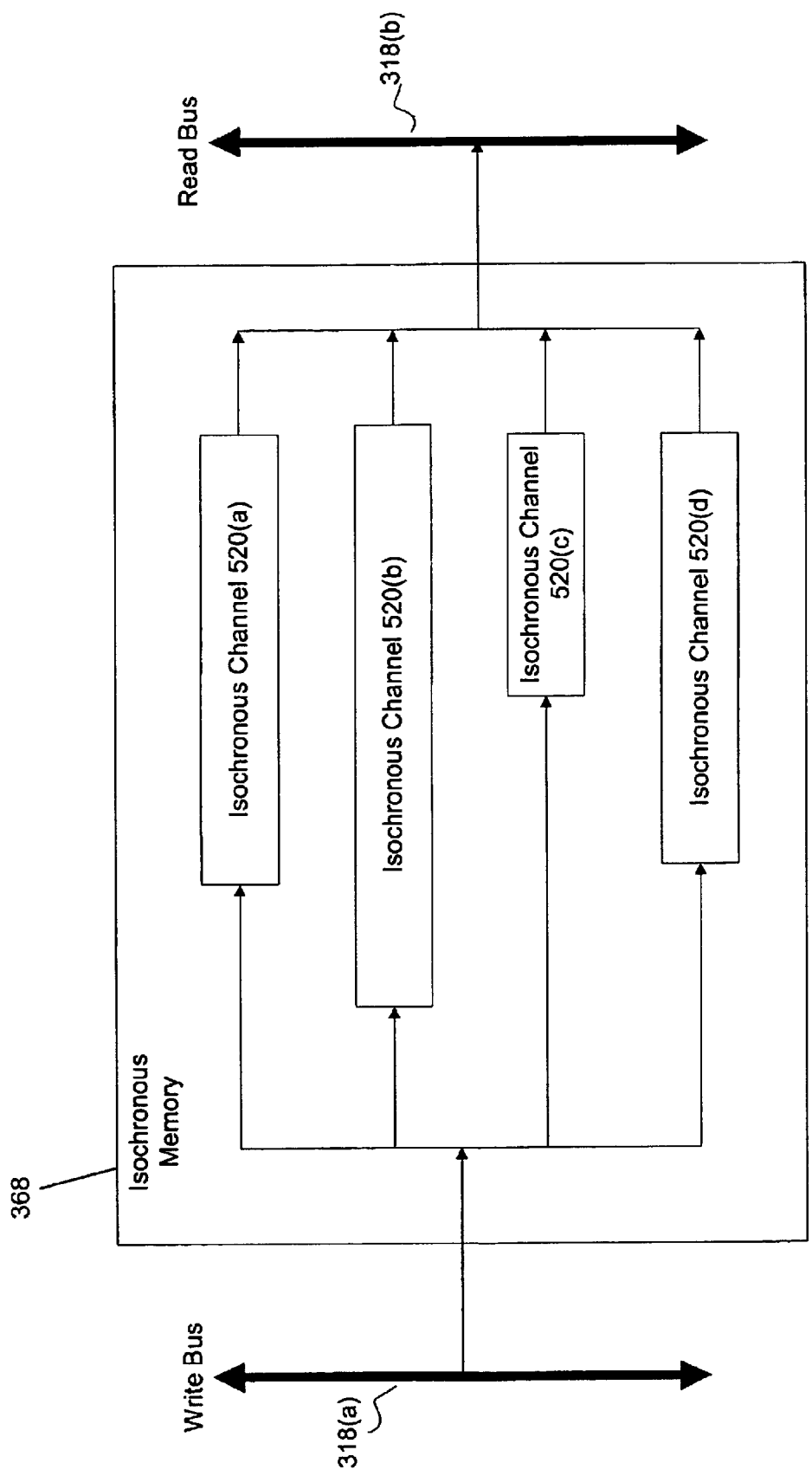
FIG. 10 is a block diagram for another embodiment of the memory of FIG. 3, in accordance with the present invention.

Referring now to FIG. 10, a block diagram for another embodiment of the FIG. 3 memory 322 is shown, in accordance with the present invention. The FIG. 10 embodiment preferably includes a plurality of variably-sized isochronous channels (520(*a*) through 520(*d*)) that may advantageously be accessed by a separate write bus 318(*a*) and a separate read bus 318(*b*). In alternate embodiments, isochronous memory 368 may readily include various other components in addition to, or instead of, the components that are discussed in conjunction with the FIG. 10 embodiment. For example, the FIG. 10 embodiment shows a four isochronous memory channels 520. However, in various other embodiments, isochronous memory 368 may include any required number of isochronous memory channels 520.

In the FIG. 10 embodiment, write bus 318(a) and read bus 318(b) may be included as part of system bus 318 (FIG. 3), or alternately may be included as part of an isochronous bus within system bus 318, as discussed above in conjunction with FIG. 8. The FIG. 10 implementation therefore advantageously supports concurrent isochronous write operations and isochronous read operations, in accordance with the present invention. For example, isochronous memory 368 may receive and store isochronous data from I/O bus 314 via write bus 318(a), and concurrently provide isochronous data to CPU 320 via read bus 318(b).

In certain embodiments of the present invention, computer 116 may include a transfer arbiter 370 (see FIG. 3) to manage access to write bus 318(a) and read bus 318(b). Transfer arbiter 370 may operate to limit access to either write bus 318(a) or read bus 318(b) whenever write bus 318(a) or read bus 318(b) are currently in use for a given isochronous data transfer. Transfer arbiter 370 may utilize any appropriate technique to arbitrate for access and control of write bus 318(a) or read bus 318(b). In certain embodiments, computer 116 may include a separate write transfer arbiter and a separate read transfer arbiter instead of the single transfer arbiter 370 discussed above.

Figure 11:
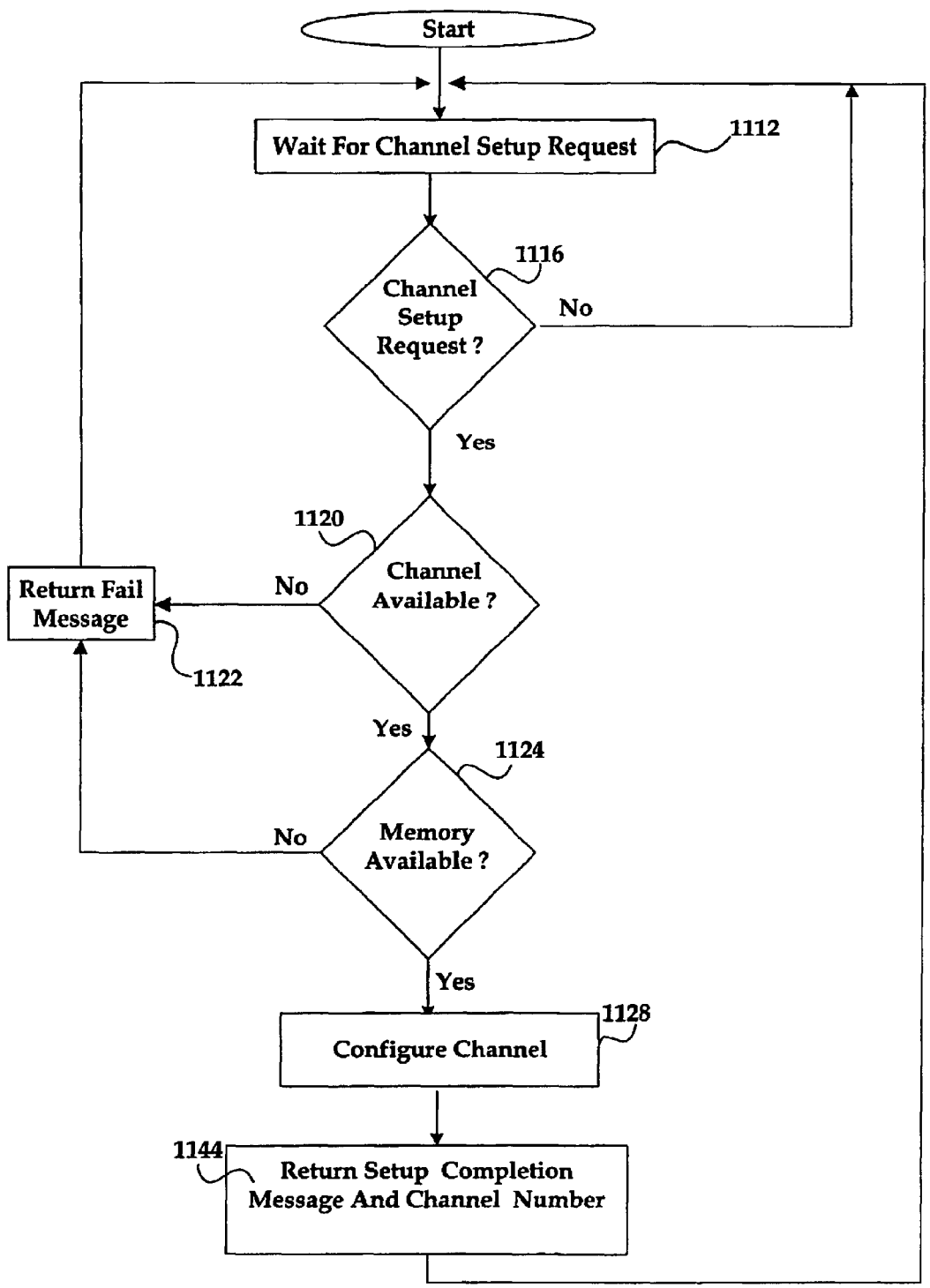
FIG. 11 is a flowchart of method steps for performing a channel setup procedure, in accordance with one embodiment of the present invention.

Referring now to FIG. 11, a flowchart of method steps for performing a channel setup procedure is shown, in accordance with one embodiment of the present invention. In alternate embodiments, the present invention may similarly utilize various other steps in differing sequences, in accordance with the present invention.

In the FIG. 11 embodiment, initially, in steps 1112 and 1116, memory manager 812 preferably waits for a channel setup request from a requesting entity. For example, application software 412 or operating system 414 may seek, by means of CPU 320, to initiate a new isochronous process that requires an additional memory channel 520 in isochronous memory 368. In certain embodiments, the foregoing channel setup request may include various relevant information. For example, the channel setup request may include a data transfer size, an isochronous process identifier, a transmission bus channel number (from I/O bus 314 and/or network bus 132) for mapping to a corresponding isochronous memory channel number in memory channels 520, and a transfer direction indicator.

If memory manager 416 receives a channel setup request in step 1116, then, in step 1120, memory manager 416 begins a channel allocation procedure, and preferably determines whether an additional memory channel 520 is available by analyzing memory registers 524, as discussed above in conjunction with FIG. 6. If no additional memory channels 520 are available, then, in step 1122, memory manager 416 preferably returns a fail message to the requesting entity, and the FIG. 11 process returns to step 1112 to wait for another channel setup request.

However, if an additional memory channel 520 is available, then, in step 1124, memory manager 416 determines whether sufficient memory space is available in isochronous memory 368 by analyzing memory registers 524, as discussed above in conjunction with FIG. 6. If insufficient memory space is available in isochronous memory 368, then, in step 1122, memory manager 416 preferably returns a fail message to the requesting entity, and the FIG. 11 process returns to step 1112 to wait for a new channel setup request.

However, if sufficient memory space is available in isochronous memory 368, then, in step 1128, memory manager 416 provides a channel authorization signal to memory controller 516 which responsively configures an additional channel in memory channels 520 to service the new isochronous process. Finally, in step 1144, memory manager 416 preferably returns a setup completion message and a channel number for the newly-configured memory channel 520 to the requesting entity. Memory manager 416 also preferably updates channel registers 620 to account for the additional memory channel 520, and the FIG. 11 process terminates.

Figure 12:
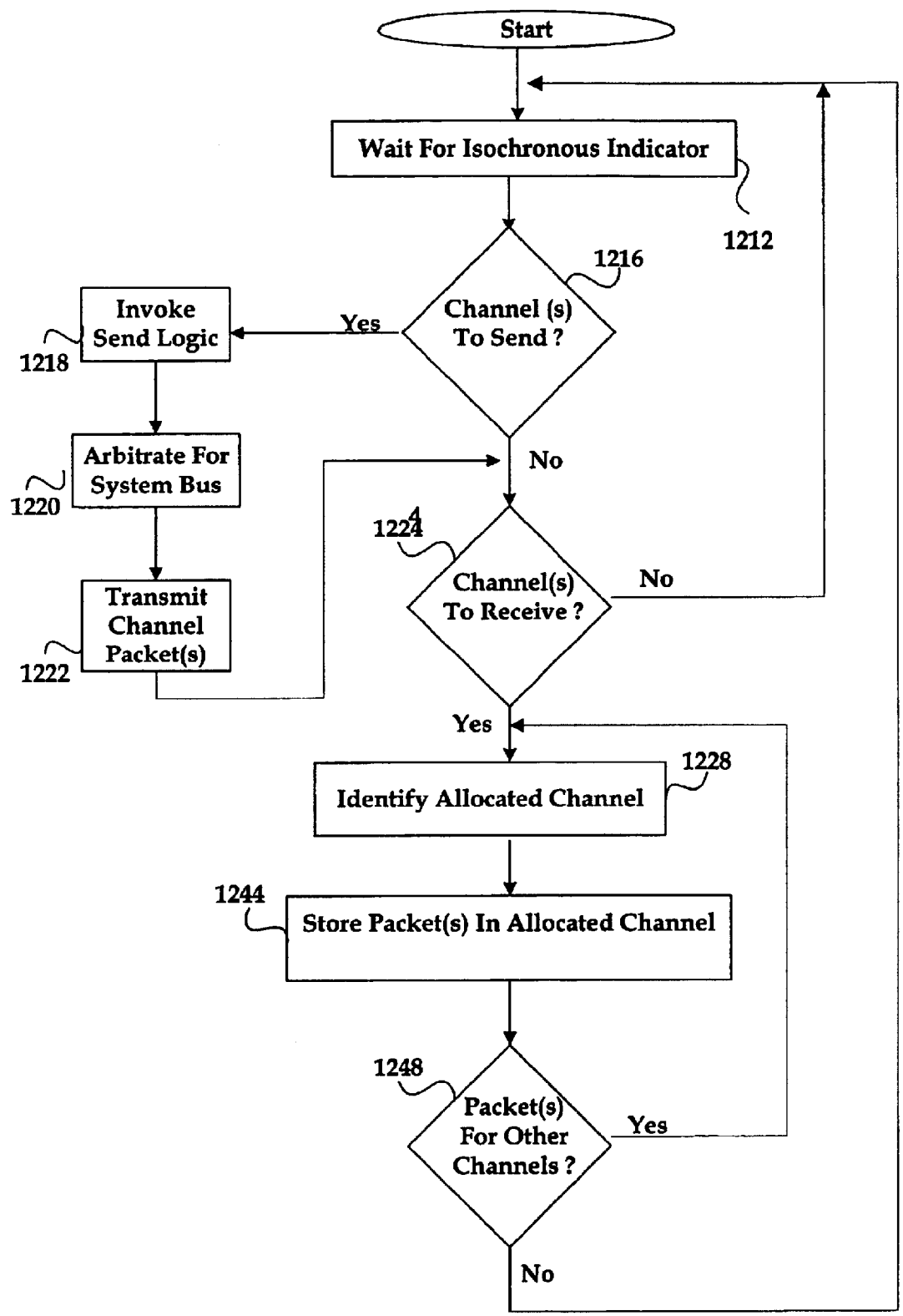
FIG. 12 is a flowchart of method steps for performing a I/O-bus data transfer operation, in accordance with one embodiment of the present invention.

Referring now to FIG. 12, a flowchart of method steps for performing a data transfer operation between isochronous memory 368 and I/O bus 314 is shown, in accordance with one embodiment of the present invention. In alternate embodiments, the present invention may similarly utilize various other steps in differing sequences, in accordance with the present invention.

In the FIG. 12 embodiment, initially, in step 1212, memory controller 516 preferably monitors system bus 318 for any transmissions that may include an isochronous indicator to signify an isochronous process that requires high-priority handling. In certain embodiments, isochronous packets that are transmitted on system bus 318 may include a channel number to identify an appropriate corresponding memory channel 520 in isochronous memory 368. In step 1216, in response to detecting an isochronous indicator in prior step 1212, memory controller 516 then determines whether there are any memory channels 520 to send from isochronous memory 368 over system bus 318.

If there are memory channels 520 to send from isochronous memory 368 to I/O bus 314, then, in step 1218, memory controller 516 invokes send logic which, in step 1220, arbitrates for control of system bus 318, and then, in step 1222, transmits the appropriate memory channels 420 from isochronous memory 368 to I/O bus 314.

However, in foregoing step 1216, if there are no memory channels 520 to send from isochronous memory 368, then, in step 1224, memory controller 516 preferably determines whether there are any packets or other information to receive from system bus 318 for storage into memory channels 520 of isochronous memory 368. If there is nothing to receive for storage into memory channels 520, then the FIG. 12 process returns to step 1212 to wait for another isochronous indicator.

In step 1228, if there is any information for storage into memory channels 520, then memory controller 516 preferably identifies the allocated memory channel 520 for the particular isochronous transmission by referencing relevant information previously provided in the channel setup request (see step 1112 of FIG. 11). For example, memory controller may reference the previously-provided transmission bus channel number for mapping to a corresponding isochronous memory channel number in memory channels 520.

Then, in step 1244, memory controller 516 preferably stores the packets transmitted over system bus 318 into the appropriate allocated memory channel 520. In step 1248, memory controller 516 preferably determines whether there are any further transmissions over system bus 318 for storage into isochronous memory 368. If there are any further transmissions over system bus 318 for storage into isochronous memory 368, then the FIG. 12 process returns to step 1228 to repeat the storage process for isochronous memory 516. However, if there are no further transmissions over system bus 318 for storage into isochronous memory 368, then the FIG. 12 process returns to step 1212 to wait for another isochronous indicator.

Figure 13:
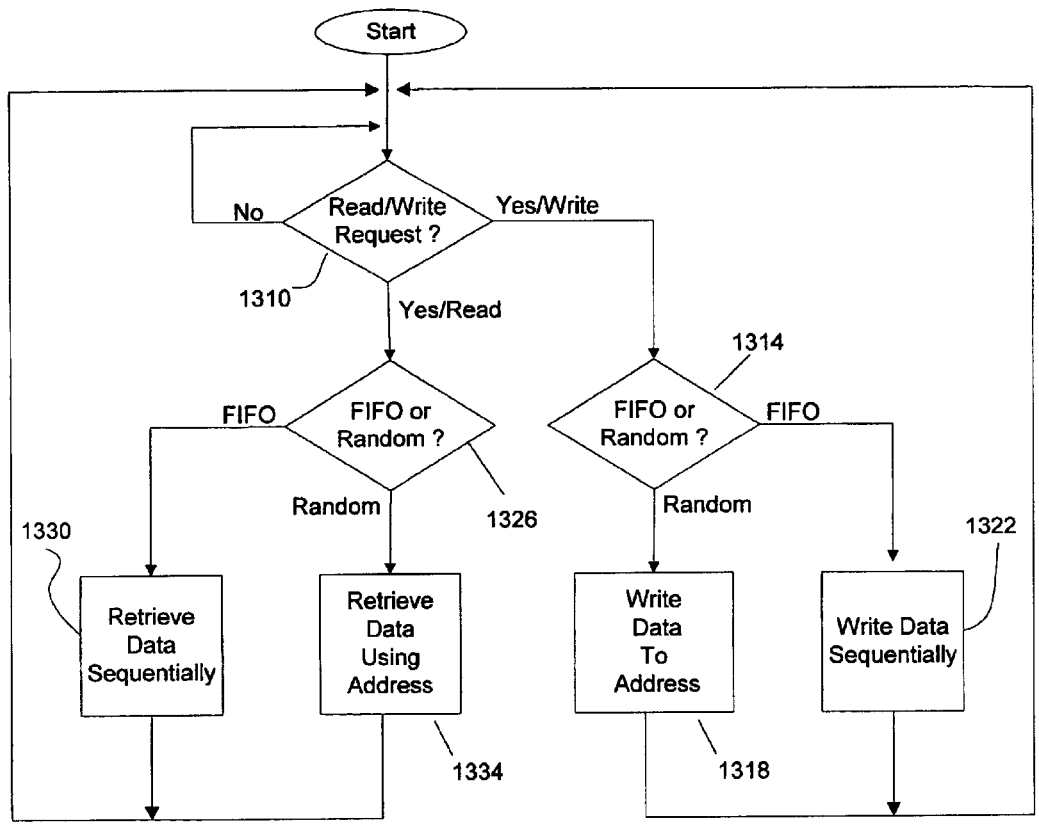
FIG. 13 is a flowchart of method steps for performing a CPU data transfer operation, in accordance with one embodiment of the present invention.

Referring now to FIG. 13, a flowchart of method steps for performing a data transfer operation between isochronous memory 368 and CPU 320 is shown, in accordance with one embodiment of the present invention. In alternate embodiments, the present invention may similarly utilize various other steps in differing sequences, in accordance with the present invention.

In the FIG. 13 embodiment, initially, in step 1310, memory controller 516 determines whether either a read request or a write request has been received from a requesting entity (such as application software 412) to transfer isochronous information to or from a memory channel 520 in isochronous memory 368 and CPU 320.

If a read request has been received, then, in step 1326, memory controller 516 determines whether the requested isochronous read operation is a first-in-first-out (FIFO) read operation or a random-access read operation. Memory controller 516 may determine the type of read operation using any appropriate method. For example, the associated read request may specify a read operation type by including a "mode" bit, or the type of isochronous process may require a certain type of read operation for successful performance.

If the isochronous read operation is a FIFO read operation, then, in step 1330, memory controller 516 sequentially retrieves data from the appropriate memory channel 520 beginning with the first data stored and ending with the last data stored in the memory channel 520. The FIG. 13 process then returns to step 1310 to wait for another read request or a write request. However, if the isochronous read operation is a random-access read operation, then, in step 1334, memory controller 516 retrieves data from the appropriate memory channel 520 using a specific address to identify a memory location in the memory channel 520. The FIG. 13 process then returns to step 1310 to wait for a read request or a write request.

In foregoing step 1310, if a write request has been received, then, in step 1314, memory controller 516 determines whether the requested isochronous write operation is a first-in-first-out (FIFO) write operation or a random-access write operation. Memory controller 516 may determine the type of write operation using any appropriate method. For example, the associated write request may specify a write operation type by including a "mode" bit, or the type of isochronous process may require a certain type of write operation for successful performance.

If the isochronous write operation is a FIFO write operation, then, in step 1022, memory controller 516 writes data into the appropriate memory channel 520 in a sequential manner. The FIG. 13 process then returns to step 1310 to wait for a read request or a write request. However, if the isochronous write operation is a random-access write operation, then, in step 1318, memory controller 516 preferably writes data into the appropriate memory channel 520 at a specific address that corresponds to a memory location in the memory channel 520. The FIG. 13 process then returns to step 1310 to wait for a read request or a write request.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an electronic device, comprising:
   a transmission source configured to provide priority information for use by said electronic device;
   a memory device coupled to said transmission source and configured to include an isochronous memory that is dedicated for storing only said priority information on a priority basis, said memory device also including an asynchronous memory for storing only asynchronous data on a non-priority basis, said memory device being reconfigurable into separate memory channels that are each mapped to a different process; and
   a processor coupled to said memory device for utilizing said priority information from said memory device.

2. The system of claim 1 wherein said priority information includes isochronous data for performing a time-sensitive isochronous process.

3. The system of claim 1 wherein said memory device and said processor are coupled to one of a computer device, a set-top box, a digital television device, and a consumer electronic device.

4. The system of claim 1 wherein said transmission source includes one of an input/output bus, a computer device, a network node, or an audio-video device.

5. The system of claim 1 wherein said electronic device is part of an electronic network that is implemented according to an IEEE 1394.

6. The system of claim 2 wherein said isochronous memory includes a memory controller, one or more memory channels, and memory registers.

7. The system of claim 6 wherein said memory registers include a total channels field, an allocated channels field, a total memory field, an allocated memory field, and one or more channel registers.

8. The system of claim 7 wherein said channel registers include a process identifier field and a required memory field.

9. The system of claim 7 wherein a memory manager initiates a channel setup procedure after receiving a channel setup request from a requesting entity to configure a new memory channel for an isochronous process, said channel setup request including a data transfer size, an isochronous process identifier, a transmission bus channel number for mapping to a corresponding isochronous memory channel number, and a transfer direction indicator.

10. The system of claim 9 wherein said memory manager allocates said new memory channel only after determining that said new memory channel is available by analyzing said total channels field and said allocated channels field in said memory registers.

11. The system of claim 9 wherein said memory manager allocates said new memory channel only after determining that a sufficient memory space is available for said new memory channel by analyzing said total memory field and said allocated memory field in said memory registers, and a required memory field in a corresponding channel register.

12. The system of claim 9 wherein said memory manager transmits a new channel allocation message to said memory controller, said memory controller responsively reconfiguring said isochronous memory to include said new memory channel.

13. The system of claim 12 wherein said memory manager returns a setup completion message and a memory channel number to said requesting entity, said memory manager also updating said memory registers to account for said new memory channel.

14. The system of claim 6 wherein said memory controller begins a data transfer operation in response to detecting an isochronous indicator.

15. The system of claim 14 wherein said memory controller determines that said data transfer operation is a send operation to an input-output bus, and responsively invokes send logic that arbitrates for access to a system bus and then transmits said isochronous data from said isochronous memory to said input-output bus over said system bus.

16. The system of claim 14 wherein said memory controller determines that said data transfer operation is a receive operation from an input-output bus, responsively utilizes a mapping technique to identify an allocated memory channel in said isochronous memory, and then transfers said isochronous data from said input-output bus over a system bus into said allocated memory channel.

17. A system for implementing an electronic device, comprising:
   a transmission source configured to provide priority information for use by said electronic device, said priority information including isochronous data for performing a time-sensitive isochronous process;
   a memory device coupled to said transmission source and configured for storing said priority information, said memory device including an isochronous memory that is reserved for storing only said isochronous data, said isochronous memory being inaccessible to any non-isochronous processes for storing non-isochronous data, said isochronous memory being reconfigurable by a memory manager and a memory controller into separate memory channels that are mapped to different respective isochronous processes; and
   a processor coupled to said memory device for utilizing said priority information from said memory device.

18. A system for implementing an electronic device, comprising:
   a transmission source configured to provide priority information for use by said electronic device, said priority information including isochronous data for performing a time-sensitive isochronous process;
   a memory device coupled to said transmission source and configured for storing said priority information, said memory device comprising an isochronous memory, said isochronous memory including a memory controller, one or more memory channels, and memory registers, said memory device also including an asynchronous memory for storing only asynchronous data on a non-priority basis; and
   a processor coupled to said memory device for utilizing said priority information from said memory device, said processor beginning a data transfer operation over a system bus by sending a data transfer request to said memory controller in said isochronous memory, said data transfer request including a mode bit to indicate one of a FIFO mode and a random-access mode.

19. The system of claim 18 wherein said processor performs a read operation from said isochronous memory, said read operation being performed sequentially in said FIFO mode, and said read operation being performed using a memory location address in said random-access mode.

20. The system of claim 18 wherein said processor performs a write operation to said isochronous memory, said write operation being performed sequentially in said FIFO mode, and said write operation being performed using a memory location address in said random-access mode.

21. A method for implementing an electronic device, comprising the steps of:
   providing priority information from a transmission source for use by said electronic device;
   configuring a memory device to include an isochronous memory that is dedicated to store only said priority information on a priority basis, said memory device also including an asynchronous memory for storing only asynchronous data on a non-priority basis, said memory device being reconfigurable into separate memory channels that are each mapped to a different process; and
   accessing said priority information from said memory device by using a processor.

22. The method of claim 21 wherein said priority information includes isochronous data for performing a time-sensitive isochronous process.

23. The method of claim 22 wherein said isochronous memory includes a memory controller, one or more memory channels, and memory registers.

24. The method of claim 23 wherein said memory registers include a total channels field, an allocated channels field, a total memory field, an allocated memory field, and one or more channel registers.

25. The method of claim 24 wherein said channel registers include a process identifier field and a required memory field.

26. The method of claim 24 wherein a memory manager initiates a channel setup procedure after receiving a channel setup request from a requesting entity to configure a new memory channel for an isochronous process, said channel setup request including a data transfer size, an isochronous process identifier, a transmission bus channel number for mapping to a corresponding isochronous memory channel number, and a transfer direction indicator.

27. The method of claim 26 wherein said memory manager allocates said new memory channel only after determining that said new memory channel is available by analyzing said total channels field and said allocated channels field in said memory registers.

28. The method of claim 26 wherein said memory manager allocates said new memory channel only after determining that a sufficient memory space is available for said new memory channel by analyzing said total memory field and said allocated memory field in said memory registers, and a required memory field in a corresponding channel register.

29. The method of claim 26 wherein said memory manager transmits a new channel allocation message to said memory controller, said memory controller responsively reconfiguring said isochronous memory to include said new memory channel.

30. The method of claim 29 wherein said memory manager returns a setup completion message and a memory channel number to said requesting entity, said memory manager also updating said memory registers to account for said new memory channel.

31. The method of claim 23 wherein said memory controller begins a data transfer operation in response to detecting an isochronous indicator.

32. The method of claim 31 wherein said memory controller determines that said data transfer operation is a send operation to an input-output bus, and responsively invokes send logic that arbitrates for access to a system bus and then transmits said isochronous data from said isochronous memory to said input-output but over said system bus.

33. The method of claim 31 wherein said memory controller determines that said data transfer operation is a receive operation from an input-utilizes output bus, responsively utilizes a mapping technique to identify an allocated memory channel in said isochronous memory, and then transfers said isochronous data from said input-output bus over a system bus into said allocated memory channel.

34. The method of claim 21 wherein said memory device and said processor are coupled to one of a computer device, a set-top box, a digital television devices and a consumer electronic device.

35. The method of claim 21 wherein said transmission source includes one of an input/output bus, a computer device, a network node, or an audio-video device.

36. The method of claim 21 wherein said electronic device is part of an electronic network that is implemented according to an IEEE 1394.

37. The method of claim 21 wherein said memory device includes a random access memory.

38. The method of claim 37 wherein said random access memory is configured to include isochronous memory which operates as a first-in-first-out memory.

39. The method of claim 21 wherein said memory device, said transmission source, and said processor communicate bi-directionally over a system bus.

40. The method of claim 39 wherein said system bus includes an asynchronous bus for transmitting asynchronous information, and an isochronous bus for transmitting isochronous information.

41. The method of claim 40 wherein said system bus comprises a control bus which includes a transfer indicator, said transfer indicator including one of an asynchronous indicator and an isochronous indicator.

42. The method of claim 41 wherein said isochronous indicator designates a transfer of said isochronous information for storing into an assigned memory channel in said isochronous memory by reference to an associated channel number.

43. The method of claim 40 wherein said isochronous bus comprises a write bus for performing a write operation to transfer said isochronous information into said isochronous memory, and also comprises a read bus for performing a read operation to transfer said isochronous information from said isochronous memory.

44. The method of claim 43 wherein said write operation and said read operation occur concurrently.

45. The method of claim 44 wherein a transfer arbiter separately limits access to one or more of said write bus and said read bus by allowing a respective current transfer operation to complete before authorizing a respective subsequent corresponding transfer operation to begin.

46. A method for implementing an electronic device, comprising the steps of:

providing priority information from a transmission source for use by said electronic device, said priority information including isochronous data for performing a time-sensitive isochronous process;

configuring a memory device to store said priority information, said memory device including an isochronous memory that is reserved for storing only said isochronous data, said isochronous memory being inaccessible to any non-isochronous processes for storing non-isochronous data, said isochronous memory being reconfigurable by a memory manager and a memory controller into separate memory channels that are mapped to different respective isochronous processes; and accessing said priority information from said memory device by using a processor.

47. A method for implementing an electronic device, comprising the steps of:

providing priority information from a transmission source for use by said electronic device, said priority information including isochronous data for performing a time-sensitive isochronous process;

configuring a memory device to store said priority information, said memory device comprising an isochronous memory, said isochronous memory including a memory controller, one or more memory channels, and memory registers, said memory device also including an asynchronous memory for storing only asynchronous data on a non-priority basis; and accessing said priority information from said memory device by using a processor, said processor beginning a data transfer operation over a system bus by sending a data transfer request to said memory controller in said isochronous memory, said data transfer request including a mode bit to indicate one of a FIFO mode and a random-access mode.

48. The method of claim 47 wherein said processor performs a read operation from said isochronous memory, said read operation being performed sequentially in said FIFO mode, and said read operation being performed using a memory location address in said random-access mode.

49. The method of claim 47 wherein said processor performs a write operation to said isochronous memory, said write operation being performed sequentially in said FIFO mode, and said write operation being performed using a memory location address in said random-access mode.

* * * * *